No. 653,009. Patented July 3, 1900.
C. H. KOYL.
APPARATUS FOR PURIFYING WATER.
(Application filed Nov. 1, 1899.)
(No Model.)
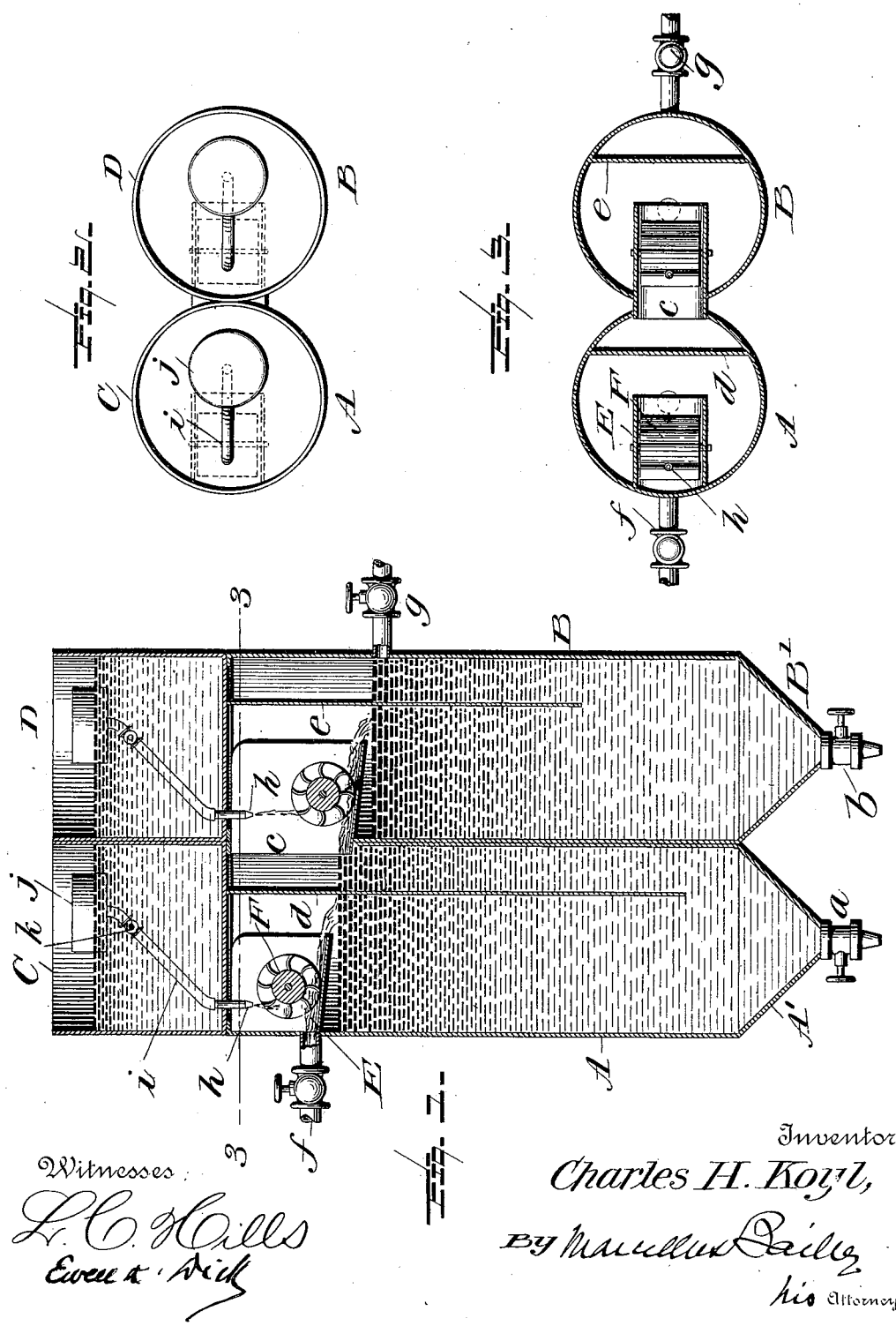
Witnesses
L. C. Hills
Everett Dick
Inventor:
Charles H. Koyl,
By Marcellus Bailey
his Attorney

UNITED STATES PATENT OFFICE.

CHARLES HERSCHEL KOYL, OF NEW YORK, N. Y.

APPARATUS FOR PURIFYING WATER.

SPECIFICATION forming part of Letters Patent No. 653,009, dated July 3, 1900.

Application filed November 1, 1899. Serial No. 735,518. (No model.)

*To all whom it may concern:*

Be it known that I, CHARLES HERSCHEL KOYL, a citizen of the United States, residing in the city of New York, in the county and State of New York, have invented a new and useful Improvement in Apparatus for Purifying Water, of which the following is a specification.

In an application of even date herewith, bearing Serial No. 735,517, I have set forth a process for the purification of water which involves the addition to and mixing with the water of certain named ingredients, preferably ferrous sulphate and sodium hydroxide. The apparatus to which my present application is directed is one intended to secure the accurate addition to and thorough intermingling with the water of these ingredients.

I will first describe the apparatus by reference to the accompanying drawings and will then point out more particularly in the claims those features of the same which I believe to be new and of my own invention.

In the drawings, Figure 1 is a vertical section of the apparatus. Fig. 2 is a plan of the same. Fig. 3 is a section on line 3 3, Fig. 1.

The apparatus comprises two separate chambers A B, through which the water successively passes. In the first it is thoroughly mingled with one of the ingredients, and in the second it has added to it the other ingredient. These chambers may be of any suitable material and construction. I prefer that they shall be two cylinders, as shown, placed in vertical position and side by side, in which position they are supported by any suitable framework. Each chamber terminates at the lower end in a hopper-shaped or tapering portion A' and B', forming a sediment-chamber provided with a discharge-outlet $a$ or $b$, closed by a suitable draw-off cock, as shown. The two chambers are in communication through an opening or duct $c$ near their upper ends.

In the chamber A is a vertical partition or baffle-plate $d$, which stops short of the bottom of the chamber, so as to leave at that point an opening through which the compartments into which the chamber is divided by the partition may communicate. There is in chamber B a similar vertical partition or baffle-plate $e$. This partition, however, is shorter than the baffle-plate $d$ in the first cylinder, so as to leave a much larger opening between the two compartments in the chamber B for the purpose hereinafter specified.

In the upper part of the chamber A is the inlet $f$ for the raw water, and in the upper part of the chamber B is the outlet $g$ for the treated water. The raw water through the inlet $f$ enters the first compartment of the chamber A, passes down under the partition $d$, and thence rises in the second compartment of that chamber until it meets the communicating duct $c$, through which it overflows into chamber B, passing down through the first compartment of that chamber under the partition $e$, thence up through the second compartment of that chamber, and finally out through the outlet $g$, whence through suitable piping or conduits it can be conducted to the filtering apparatus through which it is usual to pass the water after it has been treated.

Above the chamber A is a small tank C to contain one of the ingredients—*e. g.*, sodium hydroxide—to be added to the water, and above the other chamber is a like tank D to contain the other ingredient—*e.g.*, ferrous sulphate or other salt which will yield a flocculent precipitate or coagulant. These ingredients are dissolved or in liquid form and are to be discharged continuously and in measured quantities into the chambers below. For this purpose there is in the bottom of each tank a nozzle $h$, which discharges into the first compartment of the chamber below in connection with which the tank is used, and to this nozzle is connected a small rubber or other flexible pipe or tube $i$, to the top of which is connected a float $j$, which rests on the surface of the liquid in the tank. The liquid enters the tube through a small opening $k$ in the upper portion of the same, located so as to be, say, about an inch below the level of the liquid in the tank, and thence passes down through the tube and nozzle into the first compartment of the chamber A or B below. The float $j$ will of course rise and fall with the level of the liquid in the tank, maintaining the opening $k$ always at the same depth, the pressure under which the liquid passes down through the tube thus being uniform, notwithstanding variations in height of water in the tank.

To insure the thorough and immediate intermingling of the ingredients with the water to be treated, I make use of the following means: In the upper part of each water-chamber A or B and in the first compartment therein is located a trough E, over the floor of which runs the water that enters the chamber. In this trough and immediately below the nozzle $h$, from which the liquid ingredient drops from the tank C or D above, is journaled a small freely-revolving bucket-wheel F, which when the apparatus is in operation is kept in constant and rapid rotation by the stream of water which passes over the floor of the trough and meets the buckets of the wheel. At the same time the liquid discharged from the nozzle $h$ constantly falls upon the wheel, each bucket of which will carry a dose of the ingredient to meet and intermingle with the water which strikes the successive buckets. In this way I get thorough and immediate intermingling of the water with the ingredient. This is further secured during the passage of the water down through the one compartment and up through the second compartment of each chamber. The water after receiving its dose of the first ingredient—the sodium hydroxide—passes over into the second chamber B, where it has added to it the second ingredient—$e. g.$, ferrous sulphate (green vitriol)—and the reaction which at once sets in results, among other things, in the production of a flocculent precipitate which serves as a coagulant in the filtering operation to which the treated water is subsequently subjected.

The partition or baffle-plate $e$ in the chamber B is made quite short, so as to leave a large waterway or opening between the two compartments of that chamber. There is consequently less swirl and movement of water in the lower part of the chamber, and thus the heavier sedimentary matter and solids held in suspension in the water have better opportunity to settle in the conical bottom of the chamber. The deposits in the sediment-receptacles A' B' can be drawn off from time to time as occasion may require.

For many industrial uses—as, for example, in connection with steam-boilers or the like—the supply of water drawn from the apparatus is not continuous, but intermittent, the flow of water at the point of consumption being cut off from time to time. To prevent the apparatus from overflowing at such times, any suitable mechanical expedient can be used—as, for example, the nozzle $h$—and the water-inlet $f$ can be provided with cocks or valves, which through suitable intermediaries are connected with and operated by a float or floats contained in one of the water-chambers of the apparatus and so arranged that when the water-level rises above normal the valves or cocks will be operated to close. Expedients of this kind, however, are well known and require no description.

What I claim herein as new, and desire to secure by Letters Patent, is as follows:

1. The combination with the chambers through which the water to be treated successively passes, tanks containing the ingredients to be added to the water, and discharge-nozzles $h$ through which the said ingredients pass into the chambers, of the troughs E over the floors of which the incoming water successively passes, and bucket-wheels F, one in each trough, mounted on a horizontal axis and arranged so that the ingredients which discharge from the nozzles $h$ shall fall upon and be caught by the buckets of the wheels as they revolve, substantially as and for the purposes hereinbefore set forth.

2. In combination with a chamber provided with ducts for the entrance and escape of water, of the trough E, the bucket-wheel F, the nozzle $h$, the flexible tube $i$ and float $j$, and the tank containing said tube and float, under the arrangement and for joint operation as hereinbefore set forth.

3. The chambers A and B, provided with baffle-plates or vertical partitions $d, e$, inlet $f$, outlet $g$, and communicating duct $c$, of the trough E in each chamber, the bucket-wheel F in each trough, and a nozzle $h$ arranged over each wheel and connecting with a source of supply of the ingredients to be added to the water, as and for the purposes hereinbefore set forth.

In testimony whereof I have hereunto set my hand this 31st day of October 1899.

CHARLES HERSCHEL KOYL.

Witnesses:
JOHN HILL MORGAN,
PHILIP EARL DUDLEY.